UNITED STATES PATENT OFFICE.

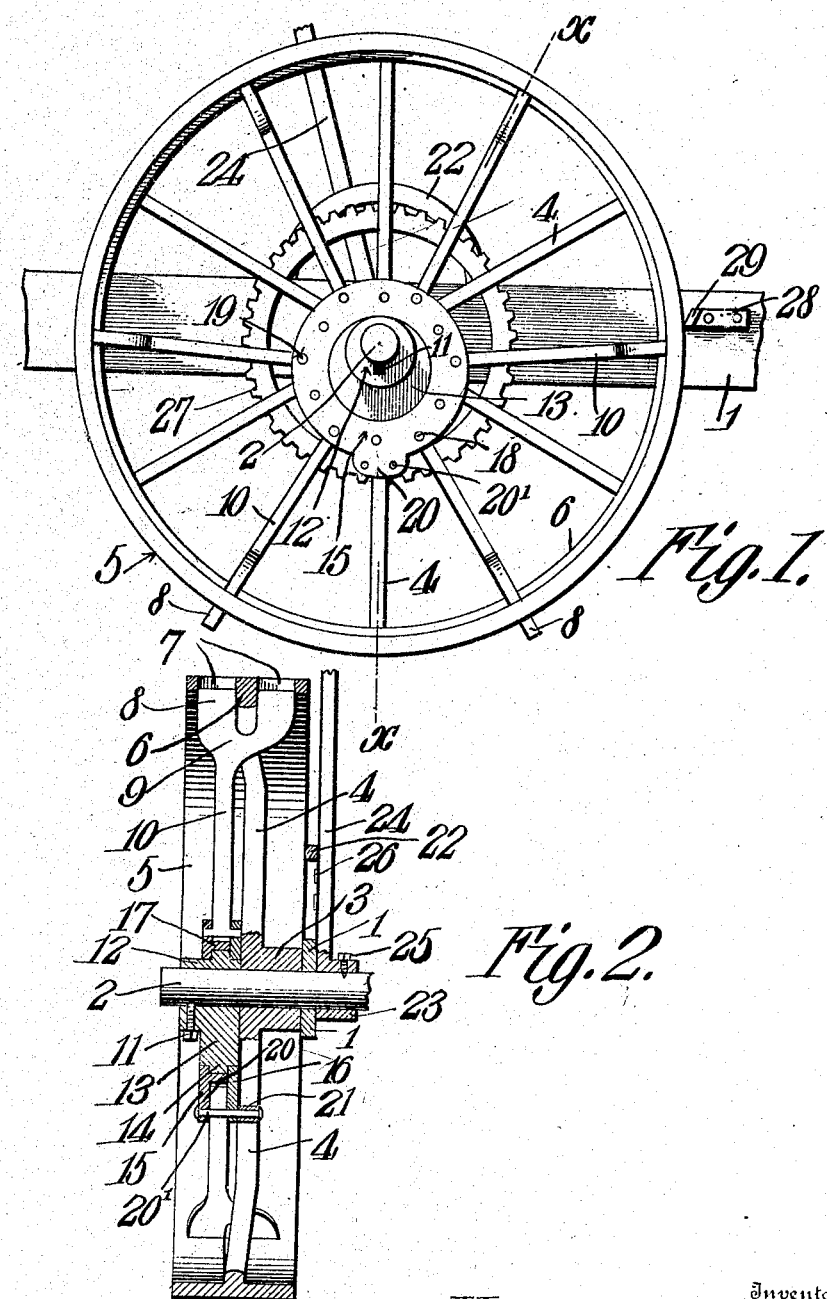

HENRY C. CLOYD, OF UNION CITY, INDIANA

TRACTION-WHEEL.

No. 899,954.

Specification of Letters Patent.

Patented Sept. 29, 1908.

Application filed January 8, 1908. Serial No. 409,839.

*To all whom it may concern:*

Be it known that I, HENRY C. CLOYD, a citizen of the United States, residing at Union City, in the county of Randolph and State of Indiana, have invented a new and useful Traction-Wheel, of which the following is a specification.

This invention has reference to improvements in traction wheels for traction engines, and its object is to provide a wheel in which the tractors are movable radially or substantially radially so as to be projected beyond the periphery of the wheel in position to engage the ground and then be retracted so that their outer ends are within the rim of the wheel. By this action of the tractors mud or dirt which tends to cling to the periphery of the wheel and thus clog the tractors from gripping the roadway, is caused to be loosened from the periphery of the wheel and in many cases spontaneously falls therefrom. In order to more thoroughly clean the wheel a scraper is provided.

The present invention comprises means for progressively projecting and retracting the tractors as the wheel revolves, with means for setting the relative points of projection and retraction in both traction wheels simultaneously. In order to strengthen the tractors and also the rims of the wheels through which they move, the tractor heads are made bifurcated so that the slots through which they pass may be divided by a strengthening web, thus adding to the resisting power of the wheel at this point.

The invention and its purposes will be more clearly understood from a consideration of the following detail description taken in connection with the accompanying drawings forming a part of this specification, in which drawings—

Figure 1 is an elevation of a traction wheel made in accordance with my invention, and Fig. 2 is a section on the line *x*—*x* of Fig. 1.
Referring to the drawings, there is shown a bar 1, which may be taken as one of the side bars of the frame of a traction engine and may be considered as indicative of the entire engine frame. Suitably journaled in this frame is the main axle 2. Upon this axle there is mounted a hub 3 from which radiates spokes 4 terminating at the rim 5 of the wheel, which rim is such as is usually used upon traction wheels except that the tractors are omitted. Extending centrally around the inner face of the rim is an annular rib 6 into which the spokes 4 merge. Midway between the spokes the rim is provided with two matched series of slots 7, 7 and each pair of slots receives the legs 8, 8 of a tractor 9 formed on one end of the stem 10.

Exterior to the hub 3 there is fast upon the axle by means of a set screw 11, another hub 12 on which is formed an eccentric 13. This eccentric is formed with an annular peripheral flange 14. Seated on the eccentric 13 on each side of the flange 14, are two annular plates 15, 16, the plate 15 being provided with a lateral annular collar 17 resting on the flange 14 of the eccentric. The plates 15 and 16 are held together by suitable bolts 18 or otherwise. That end of the stem 10 of each tractor remote from the tractor is housed between the two plates 15 and 16 and may be formed with trunnions 19 engaging in suitably matched supports for the ends of the tractor stems. The trunnions may of course be replaced by pivot bolts. At one side, each plate 15 and 16 is formed with an ear 20, and the plates are joined by bolts or rivets 20' separated sufficiently to straddle one of the spokes 4. These rivets 20' are long enough to carry rollers 21 on each side of the spoke 4 which is straddled by these rivets. The two plates 15 and 16 are thus constrained to rotate with the wheel but are free to move radially with reference to the wheel, being guided by the particular spoke 4 straddled by the rollers 21 and rivets 20'.

Fast upon the side bar 1 is a rack segment 22, and fast upon the axle 2 is the hub 23 of a lever 24, this hub being secured to the axle by a set screw 25. The lever is so arranged as to engage in notches 26 formed in one side face of the segment 22. The traction wheel may be provided with a gear 27 by means of which power is imparted to it.

Let it now be assumed that the parts are in the position shown in Fig. 1, with the eccentric having its longest radius downward. In this position the rings 15 and 16 will be in their lowermost position and the tractors 9 will have their ends eccentric to the rim of the wheel so that the lowermost tractors will project beyond the rim of the wheel while the uppermost tractors will be retracted to the greatest extent and the other tractors will be retracted proportionately. As the wheel rotates, those tractors which are brought lowermost will be projected and will be later retracted as the wheel turns. Suppose, now, that the lever 24 be moved to the right as viewed in Fig. 1, then the axle 2 will be rotated and the eccentric 13 will participate in this rotation so that its longest radius is no longer downward but slants toward the left, as viewed in Fig. 1. It is obvious that the tractors are projected sooner than in the position shown in Fig. 1 and begin to be retracted before they reach the ground. In the position shown in Fig. 1, the tractors when in contact with the ground are projected to their greatest extent, and consequently this position is best adapted for soft ground. When the lever 24 is moved toward the right, as viewed in Fig. 1, the extent of projection of the tractors by the time they come into contact with the ground, is lessened. This is the position best adapted for harder ground, and for the hardest ground or roadway the lever may be thrown still further toward the right, as viewed in Fig. 1. The adjustment of the lever is such that the tractors may be so timed in their projection as to be withdrawn before reaching that point where the wheel is in contact with the roadway, which would be the position for moving the traction engine upon paved roads or streets.

It is to be observed that the frame 1 and the hub of the eccentric serve to hold the traction wheel hub 3 in place on the axle about which latter the hub 3 is free to rotate.

When the tractors are withdrawn into the rim of the wheel, any mud or dirt which may cling to them is scraped off by the edges of the slots 7. However, more or less mud will sometimes cling to the rim of the wheel, and for this purpose there is provided a scraper 28 fast on the frame 1 and having a scraping head 29 in close relation to the rim of the wheel but in position to engage the same at a point where the tractors are always retracted. By fixing the scraper to a rigid part of the frame it serves the purpose of a scraper without springing away from the wheel and may, therefore, be adjusted into close relation with the wheel without danger of catching thereon.

The axle 2 is in practice provided with a wheel at each end, as is usual, and the tractors are provided in each wheel so that the axle serves as a means for adjusting the tractors of both wheels simultaneously.

What is claimed is:—

1. A traction wheel having matched slots through its rim on opposite sides of the center line thereof, and radially-movable tractors having bifurcated heads, the legs of which are disposed laterally with relation to the wheel rim and are movable through the slots in said rim.

2. A traction wheel provided with a rim having an inwardly-projecting annular rib formed in one piece with the rim, said rim having matched slots extending through it in annular series, one on each side of the rib, tractors having bifurcated heads arranged laterally with reference to the wheel rim and adapted to move through the slots in said rim, and means for causing the progressive projection and retraction of the tractors as the wheel revolves.

3. A traction wheel provided with a rim, spokes and hub in fixed relation one to the other, tractors movable progressively through the rim and an eccentrically mounted carrier for the inner ends of the tractors, and means for holding the eccentric mounting of the tractors to a spoke of the traction wheel for rotation therewith but permitting longitudinal movement of the tractor holder with relation to said spoke.

4. A traction wheel provided with a rim, spokes and hub in fixed relation one to the other, tractors movable progressively through the rim and an eccentrically mounted carrier for the inner ends of the tractors, and means for holding the eccentric mounting of the tractors to a spoke of the traction wheel for rotation therewith but permitting longitudinal movement of the tractor holder with relation to said spoke comprising rollers on each side of the spoke and having their journals on and projecting from the tractor carrier.

In testimony that I claim the foregoing as my own, I have hereto affixed my signature in the presence of two witnesses.

HENRY C. CLOYD.

Witnesses:
GERTRUDE CLOYD,
S. R. BELL.